United States Patent [19]

Reid, Jr.

[11] 3,969,781

[45] July 20, 1976

[54] MOORING AND CARGO TRANSFER SYSTEM FOR DIFFICULT HANDLING CARGO

[75] Inventor: William R. Reid, Jr., Northridge, Calif.

[73] Assignee: Imodco, Inc., Los Angeles, Calif.

[22] Filed: Aug. 27, 1973

[21] Appl. No.: 392,037

[52] U.S. Cl. ..................................... 9/8 P; 141/44; 141/387
[51] Int. Cl.² ..................... B63B 21/52; B65B 3/04
[58] Field of Search ................... 9/8 P; 285/DIG. 5; 137/563, 236; 141/44, 45, 387, 290; 277/15, 16, 22; 62/55, 54, 45; 220/85 VR, 85 VS; 55/55, 189

[56] References Cited
UNITED STATES PATENTS

| | | | |
|---|---|---|---|
| 2,336,430 | 12/1943 | Wery | 141/44 |
| 3,082,440 | 3/1963 | Rhedin | 9/8 P |
| 3,414,918 | 12/1968 | Petrie et al. | 9/8 P |
| 3,596,674 | 8/1971 | Takizawa et al. | 135/563 |
| 3,735,435 | 5/1973 | Mikulicic et al. | 9/8 P |
| 3,775,989 | 12/1973 | Mursinna et al. | 62/55 |
| 3,838,718 | 10/1974 | Flory et al. | 141/387 |

*Primary Examiner*—Trygve M. Blix
*Assistant Examiner*—Charles E. Frankfort
*Attorney, Agent, or Firm*—Lindenberg, Freilich, Wasserman, Rosen & Fernandez

[57] ABSTRACT

A mooring and cargo handling system for difficult-to-handle cargo such as liquified natural gas (LNG), is provided, which includes a swivel unit mounted on a mooring station and having rotatably connected sections respectfully coupled to a shore installation and to a ship that is moored to the mooring station. The swivel unit sections are connected by a rotary bearing and rotary outer seal, and the unit has a wall forming an auxiliary chamber extending along the bearing and seal, so that evaporating LNG must pass through the auxiliary chamber before it can escape through the bearing and outer seal. A gas pipe connects the auxiliary chamber to the ship or the shore installation where the evaporated gas can be flared or reliquified.

5 Claims, 11 Drawing Figures

MOORING AND CARGO TRANSFER SYSTEM FOR DIFFICULT HANDLING CARGO

BACKGROUND OF THE INVENTION

This invention relates to mooring and cargo handling systems of the type which transfer cargo through conduits that extend from a shore or other primary installation to a ship while the ship is free to drift about its mooring point.

A variety of liquid cargos can be transferred to or from large tankers by mooring and cargo handling systems that lie in the sea and which are connected by pipelines that run along the sea bottom to the shore or to a nearby floating installation. Such systems include an anchored buoy to which the ship can be moored, and one or more hoses that can extend to the ship. The system is normally constructed so that a ship which is moored to the buoy and connected to the cargo-transfer hoses, can drift freely about the buoy. This is accomplished by utilizing a cargo swivel unit with a lower section connected to the undersea conduits and an upper section rotatably mounted on the lower section and connected to hoses that lead to the ship.

The design of mooring and cargo transfer systems is complicated in the case of certain types of cargos. Liquified natural gas (LNG) is one type of cargo which is difficult to handle because it can evaporate during the transfer, and because the evaporated LNG can become dangerous if large quantities leak into the environment. Such leakage can occur at the swivel unit through the rotary seals thereof. Another type of cargo which is difficult to handle is a slurry containing hard or abrasive particles that can hamper proper operation of the bearings of the swivel unit if allowed to leak into the bearings. A cargo transfer system which facilitated the transfer of difficult cargos of these types would have wide application in the ship transport of materials.

SUMMARY OF THE INVENTION

In accordance with one embodiment of the present invention, a cargo swivel unit is provided which facilitates the transfer of liquified natural gas (LNG) by minimizing the leakage of LNG into the environment through the rotary seals of the unit. The swivel unit includes a lower section connected to a shore installation or the like and an upper section rotatably connected to the lower section and coupled through conduits to a ship. The two swivel sections are rotatably connected by bearings and by an outer rotary seal that minimizes leakage of material into the environment. The lower swivel section has a wall that forms an auxiliary chamber on the inner side of the rotary bearing and seal to isolate them from the passages within the swivel sections through which liquified LNG passes. Any leakage of evaporated or liquified LNG from the passages occurs first into the auxiliary chamber, and only after the material has passed through the auxiliary chamber can it reach the bearing and outer rotary seal. The auxiliary chamber is connected through a gas pipe to the shore installation so that any LNG that leaks into the auxiliary chamber can be drawn off. This results in a low pressure in the auxiliary chamber and therefore in a minimal leakage of LNG through the outer seal and bearing into the environment.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
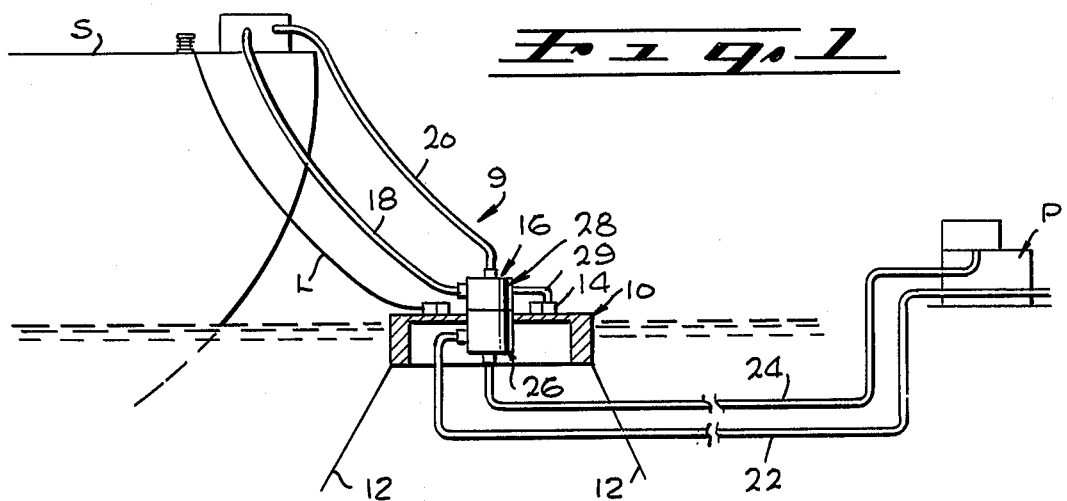
FIG. 1 is a simplified side elevation view of a mooring and cargo handling system constructed in accordance with an embodiment of the invention.

FIG. 1 illustrates a mooring and cargo transfer system 9 of the invention which includes a mooring buoy 10 which can be connected by a line L to a ship S to hold the ship close to the buoy. The buoy is held in position by anchor chains 12 that extend to the sea floor, and is attached through a rotatably mounted collar 14 to the line L to permit the ship to drift freely about the buoy location. A swivel unit 16 mounted on the buoy is connected by conduits 18, 20 to the ship and by conduits 22, 24 to a prime installation P which may be located on the shore or at a sea location near the buoy. The swivel unit 16 includes a lower section 26 fixed to the buoy and an upper section 28 which is rotatably mounted on the lower section. The upper swivel section 28 is connected by a key 29 to the mooring collar 14, so that the conduit 18, 20 leading to the ship readily circles the buoy together with the ship.

The system 9 is designed particularly for transferring liquified natural gas (LNG), that is, a normally gaseous material which has been cooled to a low temperature so that it is liquid. Two of the conduits 18 and 22 which carry the liquified material are constructed to provide a high degree of insulation to thereby minimize evaporation of the cargo. However, evaporation still occurs, and as a result, considerable leakage of gas could occur at the swivel unit 16 past the rotatable joints where the upper and lower swivel sections are connected. Such leakage is generally not acceptable because the resulting high concentration of gas would be hazardous. The system 9 and particularly the swivel unit 16 thereof, is constructed to minimize the leakage of evaporated LNG as well as to permit reliable operation in spite of the effects of the very cold liquid on the moving parts of the unit.

Figure 2:
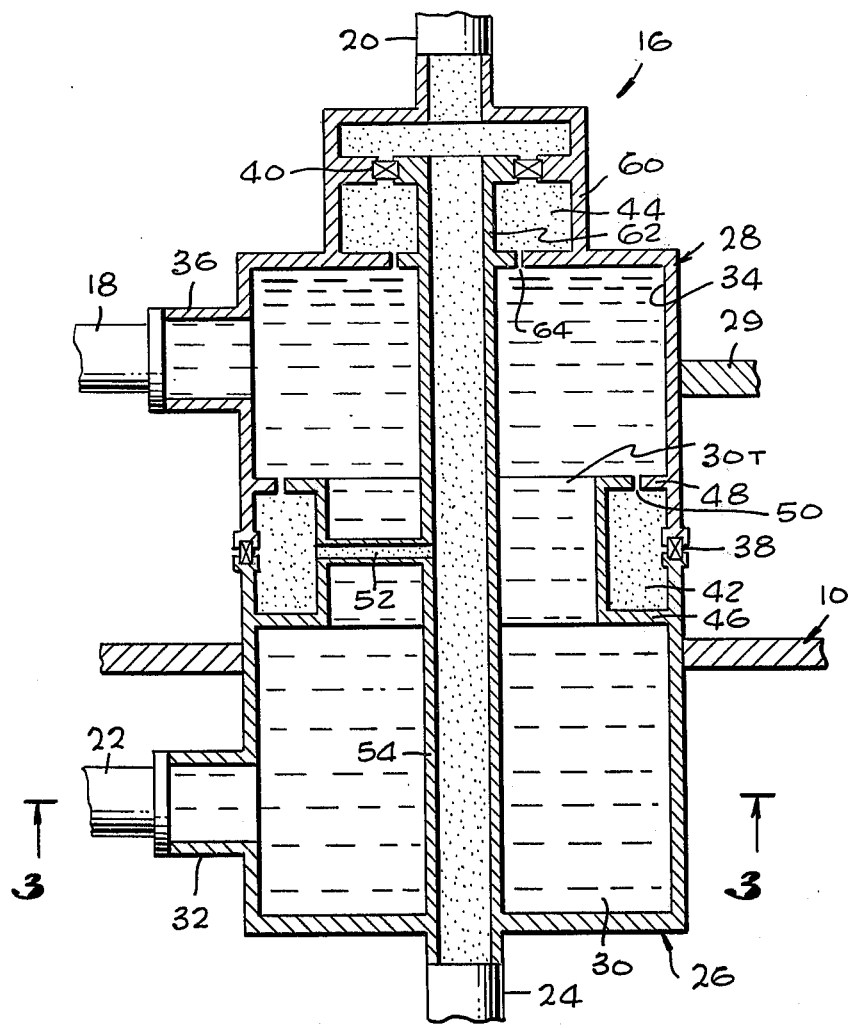
FIG. 2 is a sectional side view of the swivel unit of the system of FIG. 1.
Figure 3:
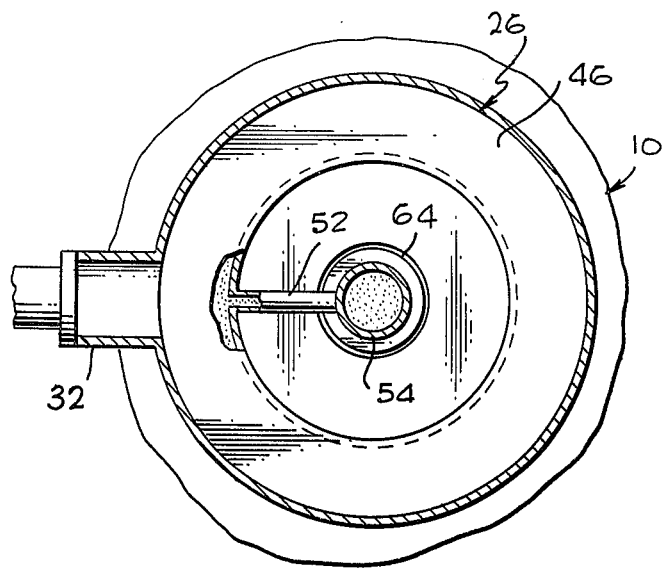
FIG. 3 is a view taken on the line 3—3 of FIG. 2.
Figure 5:
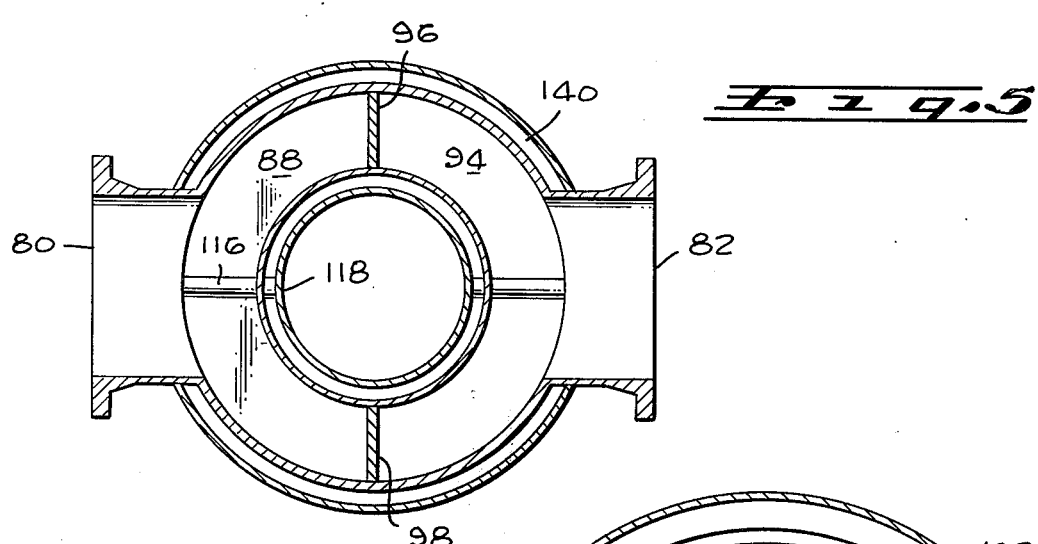
FIG. 5 is a view taken on the line 5—5 of FIG. 4.
Figure 6:
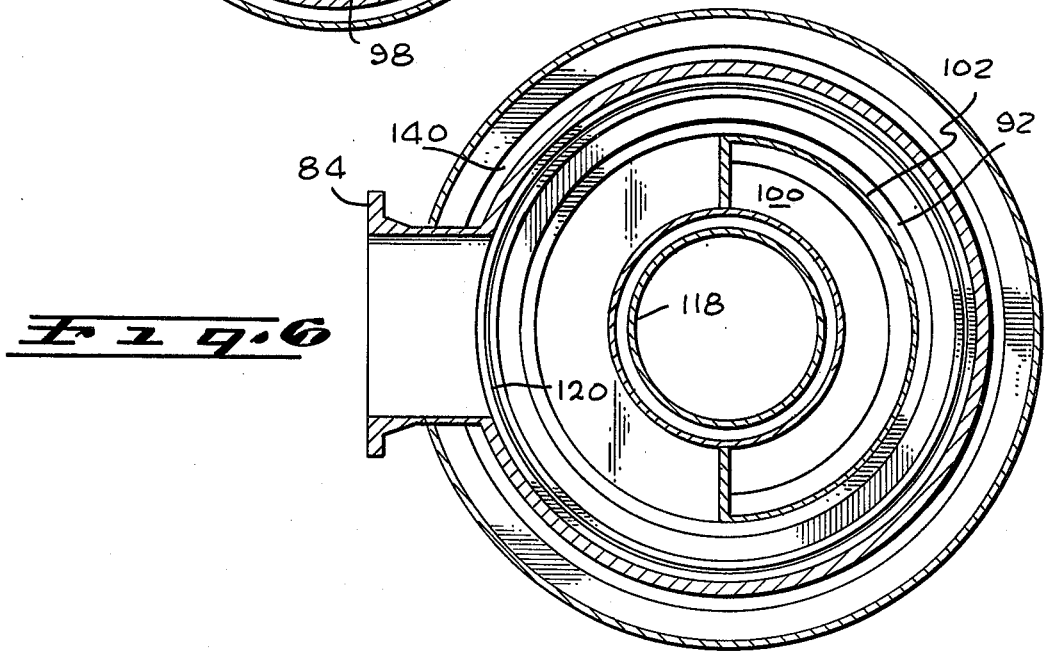
FIG. 6 is a view taken on the line 6—6 of FIG. 4.

FIG. 2 is a simplified view of the swivel unit 16, showing details of construction thereof. The lower swivel section 26 has walls forming a lower compartment, or passage 30 which has a coupling 32 for connection to the undersea conduit 22 and which is open at the top 30T. The upper swivel section 28 has an upper compartment, or passage 34 which is in communication with the top 30T of the lower passage and which has a coupling 36 that connects to the conduit 18. Thus, liquified material can pass through the lower and upper passages 30, 34 in passing between the conduits 22 and 18.

The two swivel sections 26, 28 are rotatably connected by two bearings 38, 40 which can transfer a considerable load while permitting low friction of rotation of the upper swivel section on the lower one. The swivel unit could be constructed so that the bearings, such as bearing 38, were in direct contact with the inside of the passages 30, 34. However, it would be possible for some liquid and evaporated LNG to leak through the bearing into the environment that surrounds the unit. Such leakage through bearing 38 could be reduced by providing seals on both sides of the bearing (on the inside facing the passages 30, 34 and on the outside which leads to the environment) but there could still be substantial leakage. In order to minimize leakage, the swivel unit is constructed to form a pair of auxiliary chambers 42, 44 which receive gaseous and liquid LNG before it can leak to the bearings 38, 40 and into the environment around the buoy.

The chamber 42 is formed by a wall 46 that extends from the inside of the lower swivel section 26 and which extends to another wall or flange 48 formed on the upper swivel section 28. The two walls 46, 48 form a rotatable seal at 50 where they lie adjacent to one another, so that the two swivel sections are free to rotate on one another while minimizing the loss of LNG through the region 50 into the chamber 42. The auxiliary chamber 42 is connected through a pipe 52 to a gas line 54 that extends along the vertical axis of rotation of the two swivel sections on one another. The gas line 54 is formed by pipe-like walls on the lower swivel section 26 and extending along the axis of rotation of the swivel sections. The lower end of the gas line 54 is connected to the conduit 24 that leads to the shore installation P where the gas can be disposed of by flaring (burning) or by reliquifying. Thus, the pressure within the chamber 42 is constantly relieved so there is a minimal leakage of gas through the bearing 38, and any liquid LNG that leaks through the sealed region 50 into the chamber 42 can evaporate and be drawn off rather than starting to fill the auxiliary chamber with liquid LNG. Additional rotatable seals can be provided adjacent to the bearing 38 to minimize the leakage of material therethrough.

The upper auxiliary chamber 44 is formed by walls 60 extending from the top of the upper swivel unit 28, and by an upper portion 62 of the gas line 54. A rotatable seal is provided at 64 to minimize the leakage of liquid LNG into the auxiliary chamber 44. Any gas or liquid LNG leaking into chamber 44 can still leak through the bearing 40 into the gas line 54 from which the gas is removed. However, the LNG will normally evaporate in the auxiliary chamber 44, so the chamber serves to isolate the load transfer bearing 40 from liquid LNG. The upper end of the gas line 54 is coupled to the conduit 20 that leads to the ship. This permits evaporated LNG in the ship tanks to be withdrawn to the shore installation for recycling or flaring. The connection to conduit 20 also permits the drawing off of evaporated LNG to the ship for flaring thereat in those cases where the shore or primary installation does not have gas disposal facilities.

Figure 4:
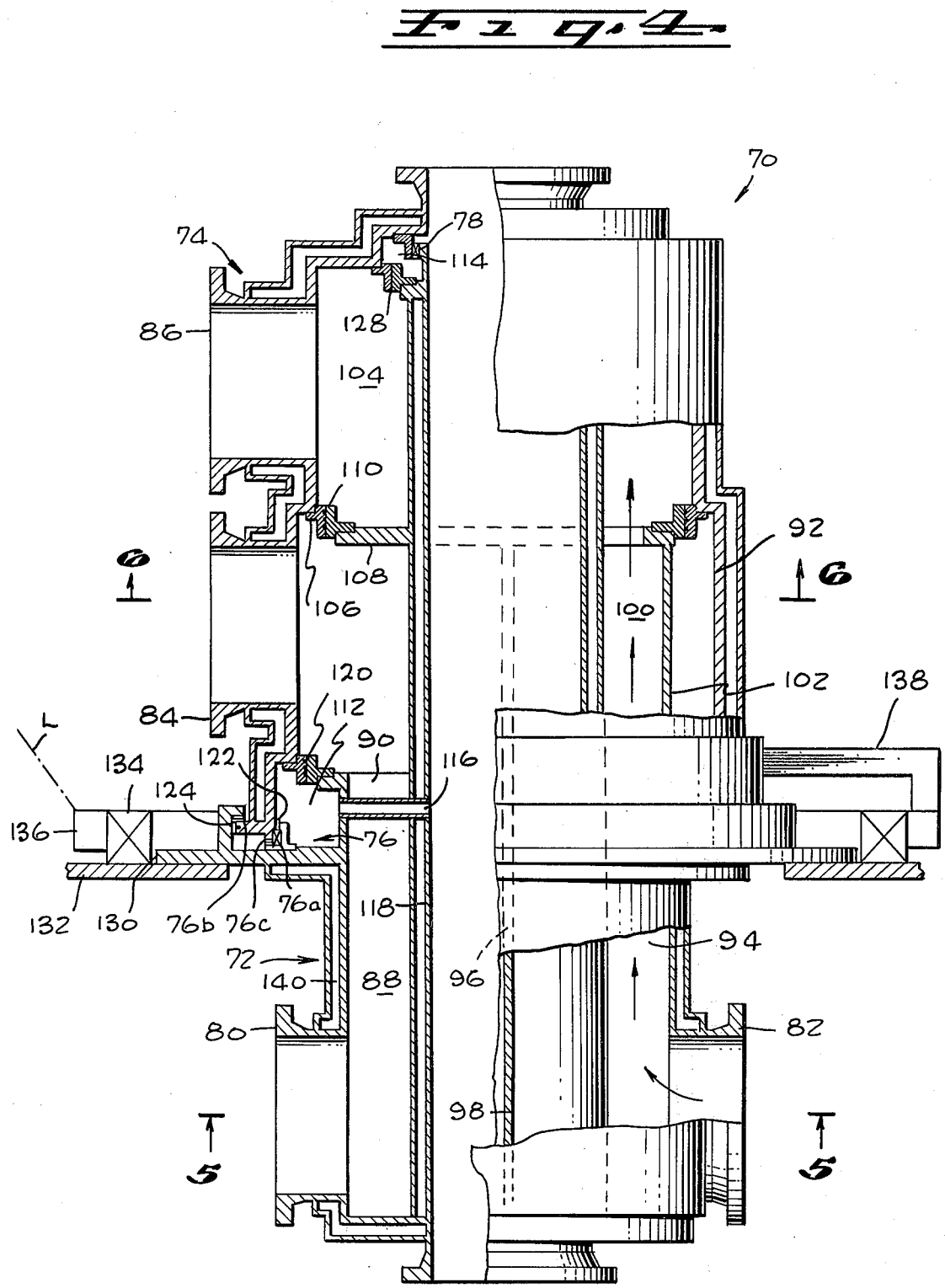
FIG. 4 is a sectional side view of a swivel unit constructed in accordance with another embodiment of the invention, which provides two separate passageways for cargo.

FIG. 4 illustrates details of another swivel unit 70 which can pass two cargos between a prime installation and a ship while maintaining the cargos separate from each other. The swivel unit 70 includes a lower swivel section 72 and an upper swivel section 74 rotatably mounted on the lower section by a pair of bearing assemblies 76, 78. The lower section 72 includes a pair of nipples or couplings 80, 82 which are connected to conduits that extend to a shore or other primary installation. The upper section 74 also includes a pair of couplings 84, 86 that are connected to conduits that lead to the ship. Material passing into the swivel unit through the coupling 80 enters a passage 88 and can pass upwardly therealong to an opening 90 into a passage 92 formed in the upper swivel section that connects to the coupling 84. Material that enters the other coupling 82 of a lower swivel section passes into a different passage 94 that is sealed from the passage 88. The two compartments or passages 88, 94 are separated by a pair of walls 96, 98. The material in the passage 94 can pass upwardly through a region 100 that is separated by a wall 102 from the upper passage 92. The material then can pass through a hole in a wall 108 and into another upper passage 104, and then out through the coupling 86.

The swivel unit has walls 106, 108 that keep the two compartments or passages 92, 104 of the upper swivel section separated, one wall 106 being fixed to the upper swivel section and the other 108 being fixed to the lower swivel section. A rotary seal 110 couples the two walls 106, 108 to permit rotation of the swivel sections while maintaining the two upper passages 92, 104 separated. The swivel unit has walls forming a pair of auxiliary chambers 112, 114. The auxiliary chamber 112 is connected through a pipe 116 to a gas line 118 from which evaporated LNG is removed. A seal 120 seals the auxiliary chamber 112 from the inside of passage 92 where liquid LNG is flowing. A pair of seals 122, 124 seal the auxiliary chamber 112 from the environment. The bearing assembly 76 includes a radial thrust bearing 76a and additional thrust bearings 76b, 76c that rotatably connect the swivel sections and that are isolated from the liquid LNG by the auxiliary chamber 112. The upper auxiliary chamber 114 is isolated by a seal 128 from the liquid LNG in the chamber 104. Gas leaking into the chamber 104 can pass through the bearing 78 which is a radial bearing type, into the gas line 118.

The lower swivel section 72 is connected at a flange 130 to the stationary deck 132 of the buoy. A heavy-duty bearing 134 rotatably connects a mooring collar 136 to the deck of the buoy. A key 138 extending between the collar 136 and upper swivel section 74 assures that the upper swivel section will rotate with the collar as a ship drifts about the buoy.

Figure 7:
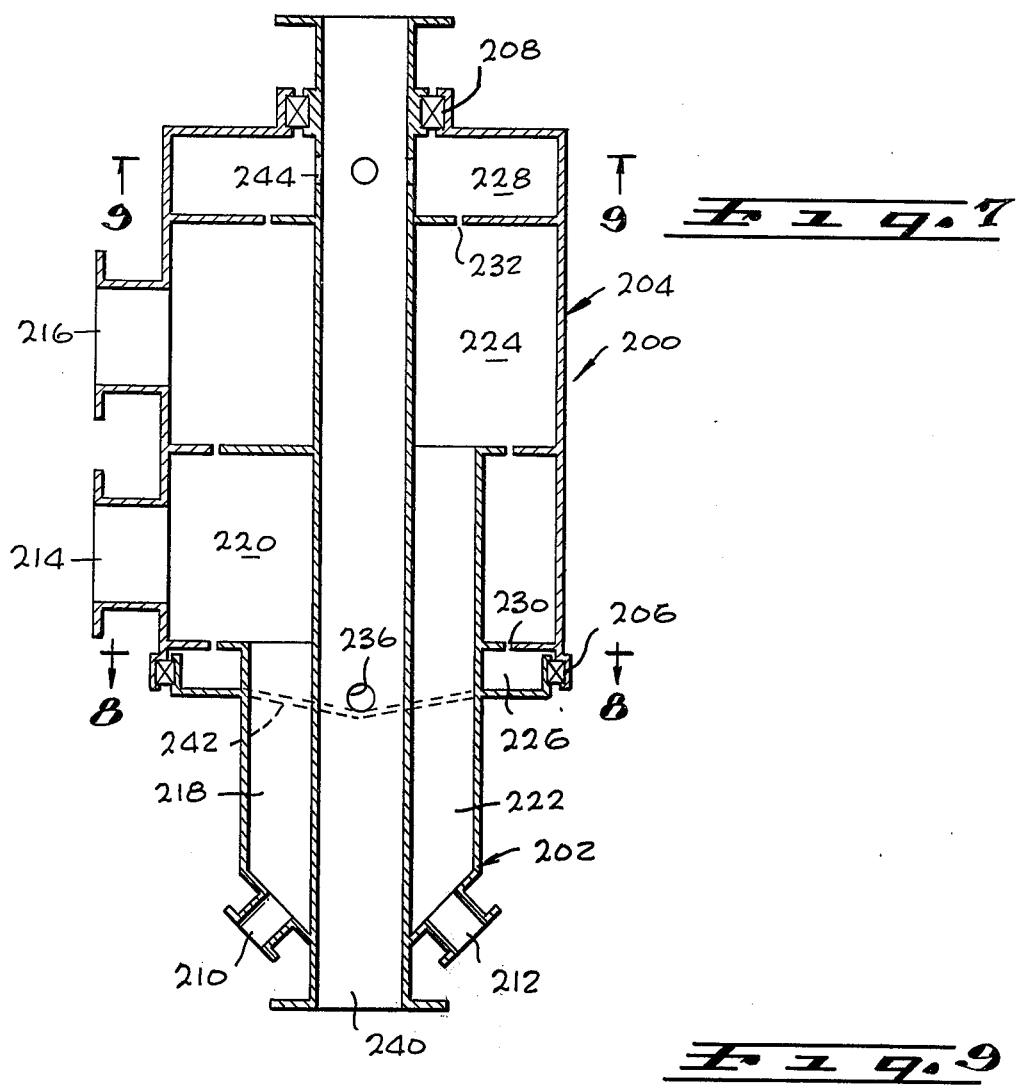
FIG. 7 is a sectional view of a swivel unit constructed in accordance with still another embodiment of the invention, which is especially useful for transferring a slurry.
Figure 8:
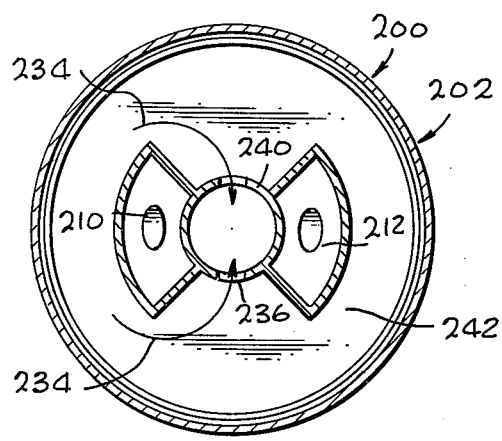
FIG. 8 is a view taken on the line 8—8 of FIG. 7.
Figure 9:
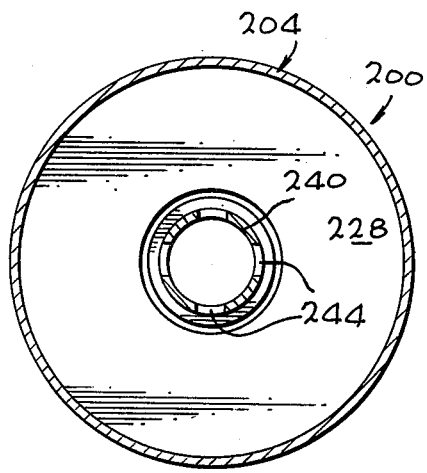
FIG. 9 is a view taken on the line 9—9 of FIG. 7.

The swivel unit construction can be utilized for other types of difficult cargo such as a slurry containing abrasive material, to protect the bearings of the swivel unit from the abrasive material. FIGS. 7–9 illustrate a swivel unit 200 similar to the unit of FIG. 4, but which is especially useful in carrying a slurry. The unit 200 includes a lower swivel section 202 and an upper swivel section 204 rotatably mounted on the lower section by a pair of bearings 206, 208. The lower section 202 includes a pair of nipples or couplings 210, 212 which are connected to conduits that extend to a shore or other primary installation. The upper section includes a pair of couplings 214, 216 that are connected to conduits that lead to the ship. A slurry passing into the swivel unit through the coupling 210 passes through passageways 218, 220 and passes out through the coupling 214. In a similar manner, a slurry entering the coupling 212 passes along passageways 222, 224 and exits at the coupling 216. The internal passages are sealed from one another in an arrangement similar to that of FIG. 4.

When a slurry passes through the swivel unit of FIG. 9, a major problem is to eliminate or limit slurry reaching the bearings 206, 208, because the particles in the slurry can interfere with proper operation of the bearings. This is accomplished by utilizing a pair of auxiliary chambers 226, 228 which receive any slurry that passes through spaces at 230, 232, where the lower and upper units are rotatably sealed. Slurry passing through the opening or seal at 230 enters the chamber 226, where it can pass along a path indicated by arrow 234 (FIG. 8) through an opening 236 into a collection pipe 240. The walls at 242 at the bottom of the auxiliary chamber 226 are sloped towards the opening 236 to encourage particles to move towards the collection pipe. Material passing up through the seal or opening at 232 may similarly pass along the bottom wall of the chamber 228 and through openings 244 into the collection pipe 240. The constant disposal of leaked slurry into the collection pipe 240 largely prevents the slurry from moving out through the bearings 206, 208 and therefore largely protects the bearings against an abrasive slurry. It may be noted that a similar arrangement can be utilized for liquid such as oil, although in the case of materials lighter than water the bearing 208 is preferably located below the top wall of the collection chamber 228.

Figure 10:
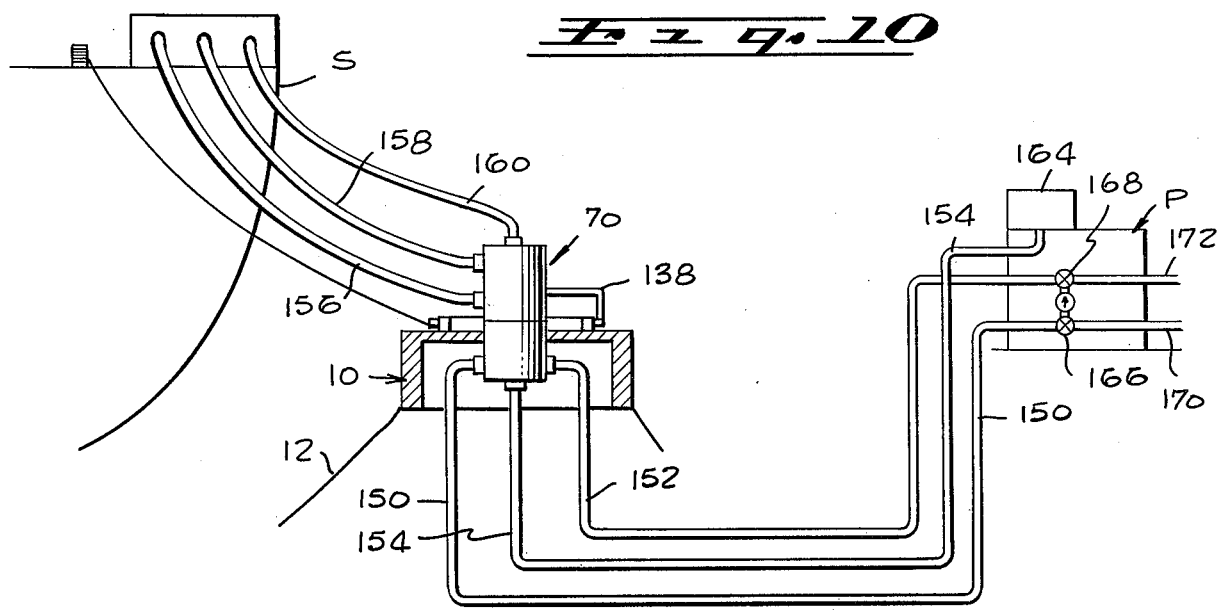
FIG. 10 is a simplified side view of yet another mooring and cargo handling system, shown during the transfer of cryogenically liquified material between a primary installation and a ship.
Figure 11:
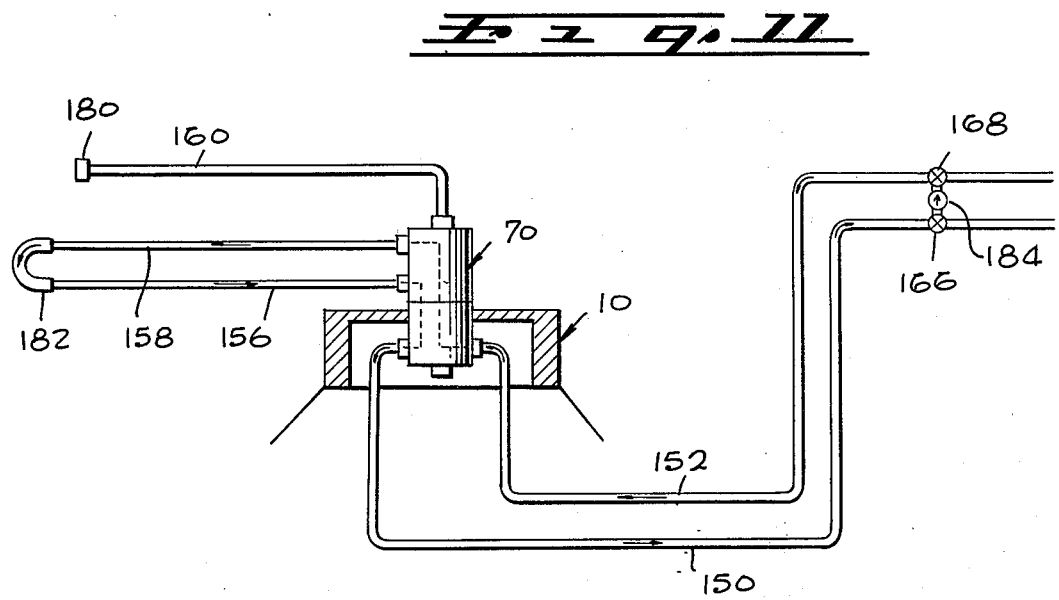
FIG. 11 is a view of the system of FIG. 10 showing a method for maintaining the system in a ready state when it is not connected to a ship.

The walls of the swivel unit 70 are constructed to minimize the transfer of heat between LNG flowing through the unit and the environment. To this end, most of the walls of the unit include two spaced wall portions insulated from one another by vacuum 140. The hoses that carry the liquid LNG are also highly heat insulative to minimize evaporation of LNG. However, considerable heat transfer still occurs. The removal of evaporating LNG through the gas line 118 solves many of the problems resulting from heat transfer during cargo transfer. However, inbetween cargo transfers, when no LNG is flowing through the system, the heat transfer can result in evaporation all of the LNG, in the conduits. When the next ship is connected to the conduits, problems may arise due to the sudden cooling of the conduits and swivel unit by LNG suddenly rushing therethrough. The suddenly rushing LNG can cause rapid contractions of parts due to the sudden cold, and can cause a sudden liberation of large amounts of gas due to the liquid coming into contact with warm conduits. FIGS. 10 and 11 illustrate a method for utilizing the dual swivel unit 70 of FIG. 4 to minimize such start-up problems.

FIG. 10 illustrates a mooring and cargo transfer system which utilizes the swivel unit 70 which is connected by three conduits 150, 152, 154 to a primary installation P, and which is connected by three conduits 156, 158, and 160 and by a mooring line 162 to a ship S. Two of the conduits 154, 160 carry evaporated LNG while the other conduits carry liquid LNG. At the shore installation P, the gas conduit 154 is connected to a reliquifying station 164 that reliquifies the gas and delivers it to a storage tank (not shown). The two liquid conduits 150, 152 are connected through a pair of valves 166, 168 to a pair of pipes 170, 172, that lead to LNG storage tanks (not shown). During cargo transfer, LNG passes through both conduits 156, 158 in the same direction, or in other words the LNG moves in parallel through these conduits.

When the cargo transfer to or from the ship S has been completed, a cap 180 is placed on the outer end of the gas conduit 160, as shown in FIG. 11. However, instead of merely capping each of the liquid conduits 156, 158, a coupling 182 is attached to these conduits to connect them in series. In addition, the valves 166, 168 at the shore installation are switched to connect the liquid lines 150, 152 together through a pump 184. The pump 184 is then operated to move the LNG remaining in the liquid conduits and swivel unit through the system so that the conduits remain filled with LNG. Additional liquid LNG may be drawn from the storage tanks at the primary installation to make up for evaporative losses. The flow of LNG through the system keeps the conduits filled with LNG and maintains them at the low temperature of LNG, so that the next cargo transfer with another ship can occur with a minimum of difficulties. The connection arrangement can be altered in a wide variety of manners. Where a swivel unit of the type illustrated in FIG. 2 is utilized, liquid LNG can be circulated through the liquid conduits by connecting the gas line 20 to the conduit 18 to circulate liquid LNG through the gas line. It is also possible to utilize liquid conduits that have small hoses running within a larger hose so as to provide two lines for circulating the LNG. It is also possible to circulate LNG through only selected parts of the cargo transfer system instead of through all of the liquid conduits thereof.

Thus, the invention provides a mooring and cargo transfer system which facilitates the transfer of difficult liquid cargos. For a cryogenically liquified material such as LNG, leakage into the environment is minimized by providing a swivel unit with an auxiliary chamber between the passages where liquid LNG flows and the rotary seal that leads to the environment, and by providing a gas line for drawing off gas that leaks into the auxiliary chamber. A load-transfer bearing that rotatably connects the sections of the swivel unit may be located between the auxiliary chamber and the environment so that it does not come into direct contact with the liquid LNG. A similar construction can be utilized in transferring other difficult cargos such as a slurry containing abrasive material, to protect the bearings of the swivel unit from the abrasive material. Any abrasive material that leaks out of the chambers of the swivel unit will leak into the auxiliary chamber where it can be allowed to fall into a collecting line so that a minimum of abrasive material reaches the bearings. In the case of an abrasive slurry, the collected material may be dumped into the ocean rather than carried through a line to the shore. The invention also provides a method for utilizing the swivel unit to minimize problems that can occur at the beginning of the transfer of extremely cold material, such as LNG, by connecting together at least two of the conduits of the system inbetween the times when there is cargo transfer with a ship, to keep at least one of the conduits cold and filled with liquid LNG.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a mooring and cargo handling system which includes a mooring station to which ships can be moored that are free to drift about the station, a first cargo conduit leading to a shorebased or other primary installation, and a second cargo conduit leading to the ship, the improvement comprising:

a swivel unit attached to the mooring station and having first and second swivel sections with passages therein, said swivel sections rotatably joined about a primarily vertical axis and with their passages coupled to each other, the passages of said first and second sections respectively coupled to the first and second cargo conduits that lead to the primary installation and to the ship;

said swivel unit having a pair of rotatable seal means between the swivel sections, and having walls defining an auxiliary chamber sealed from the environment by a first of the seal means and sealed from the passages by a second of the seal means, so that material which can leak through the second seal means is collected in the auxiliary chamber before it leaks into the environment; and pressure reducing means coupled to said auxiliary chamber for removing material therefrom, to maintain a lower pressure of material in said auxiliary chamber than the pressure which would build up in said auxiliary chamber in the absence of any removal of material therefrom, said pressure reducing means including means for resisting the escape of removed material into the environment, and said auxiliary chamber being sealed against the inflow of material therein to prevent material inflow except for any material which leaks through the seal means about the chamber.

2. Apparatus for transferring cryogenically liquified material between a shore-based or other primary installation and a ship comprising:

a swivel unit having lower and upper hollow swivel sections respectively connectable to the primary installation and to the ship, said swivel section rotatably connected so that liquified material can pass between the hollow sections while the upper swivel section rotates on the lower one, an outer ring-shaped seal between said swivel sections for sealing the swivel unit from the environment, a wall fixed to one of said swivel sections and rotatably sealed to the other swivel section to form an auxiliary chamber that separates the outer seal from the hollow regions of the swivel sections through which liquified material passes, so that evaporated cargo material must pass through the auxiliary chamber in order to pass through said outer seal into the environment, and a gas conduit coupled to said auxiliary chamber to carry away evaporated cargo material;

said gas conduit including a pipe that extends along the axis of rotation of the swivel sections and that has a first end fixed to one of the swivel sections and a second end adjacent to the other swivel section and rotatably sealed thereto.

3. Apparatus for transferring cryogenically liquified material between a shore-based or other primary installation and a ship comprising:

a swivel unit having lower and upper hollow swivel sections respectively connectable to the primary installation and to the ship, said swivel section rotatably connected so that liquified material can pass between the hollow sections while the upper swivel section rotates on the lower one, an outer ring-shaped seal between said swivel sections for sealing the swivel unit from the environment, a wall fixed to one of said swivel sections and rotatably sealed to the other swivel section to form an auxiliary chamber that separates the outer seal from the hollow regions of the swivel sections through which liquified material passes, so that evaporated cargo material must pass through the auxiliary chamber in order the pass through the outer seal into the environment, and a gas conduit coupled to said auxiliary chamber to carry away evaporated cargo material;

said gas conduit including a pipe that extends along the axis of rotation of the swivel sections and which has a lower end fixed to the lower swivel section and an upper end rotatably sealed to the upper swivel section at third and fourth locations and forming a second auxiliary chamber between the third and fourth locations so that liquified material being transferred must pass first through the seal formed at the third location before reaching the seal formed at the fourth location; and a first bearing located at said outer seal and a second bearing located at said fourth location, said bearings rotatably supporting the upper swivel section on the lower swivel section, whereby to avoid contact between the bearings and the liquified material while it is in a liquid state.

4. Apparatus for transferring cryogenically liquified material between a shore-based or other primary installation and a ship comprising:

a swivel unit having lower and upper hollow swivel sections respectively connectable to the primary installation and to the ship, said swivel section rotatably connected so that liquified material can pass between the hollow sections while the upper swivel section rotates on the lower one, an outer ring-shaped seal between said swivel sections for sealing the swivel unit from the environment, a wall fixed to one of said swivel sections and rotatably sealed to the other swivel section to form an auxiliary chamber that separates the outer seal from the hollow regions of the swivel sections through which liquified material passes, so that evaporated cargo material must pass through the auxiliary chamber in order to pass through the outer seal into the environment, and a gas conduit coupled to said auxiliary chamber to carry away evaporated cargo material;

each of said swivel section having walls dividing the hollow interior into first and second compartments, the first compartments of the swivel sections being in communication with each other and the second compartments of the swivel sections being in communication with each other but sealed from the first compartments;

insulative conduits extending from the first and second compartments of the upper swivel section for carrying the liquified material between a ship and the swivel unit; and means detachably connecting together the ends of said conduits which are opposite the swivel unit, so that after the transfer of liquified material between the swivel unit and a ship, cold material can be circulated through the conduits to keep them cold and therefore ready for a next transfer of cryogenically liquified material.

5. In a mooring and cargo handling system which includes a mooring station to which ships can be moored that are free to drift about the station, a first cargo conduit leading to a shore-based or other primary installation, and a second cargo conduit leading to the ship, the improvement comprising:

a swivel unit attached to the mooring station and having first and second swivel sections with passages therein, said swivel sections rotatably joined about a primarily vertical axis and with their passages coupled to each other, the passages of said first and second sections respectively coupled to the first and second cargo conduits that lead to the primary installation and to the ship;

said swivel unit having a pair of rotatable seal means between the swivel sections, and having walls defining an auxiliary chamber sealed from the environment by a first of the seal means and sealed from the passages by a second of the seal means, so that material which can leak through the second seal means is collected in the auxiliary chamber before it leaks into the environment; and said swivel unit having third conduit means connected to the auxiliary chamber for carrying away material therefrom;

said third conduit means including a central passageway which extends along the axis of rotation of the swivel units, and at least one pipe extending through a swivel unit passage to connect the auxiliary chamber to the central passageway.

\* \* \* \* \*